June 24, 1941. H. K. FOSTER 2,247,229
ELECTRICAL COOKING APPARATUS
Filed June 3, 1939
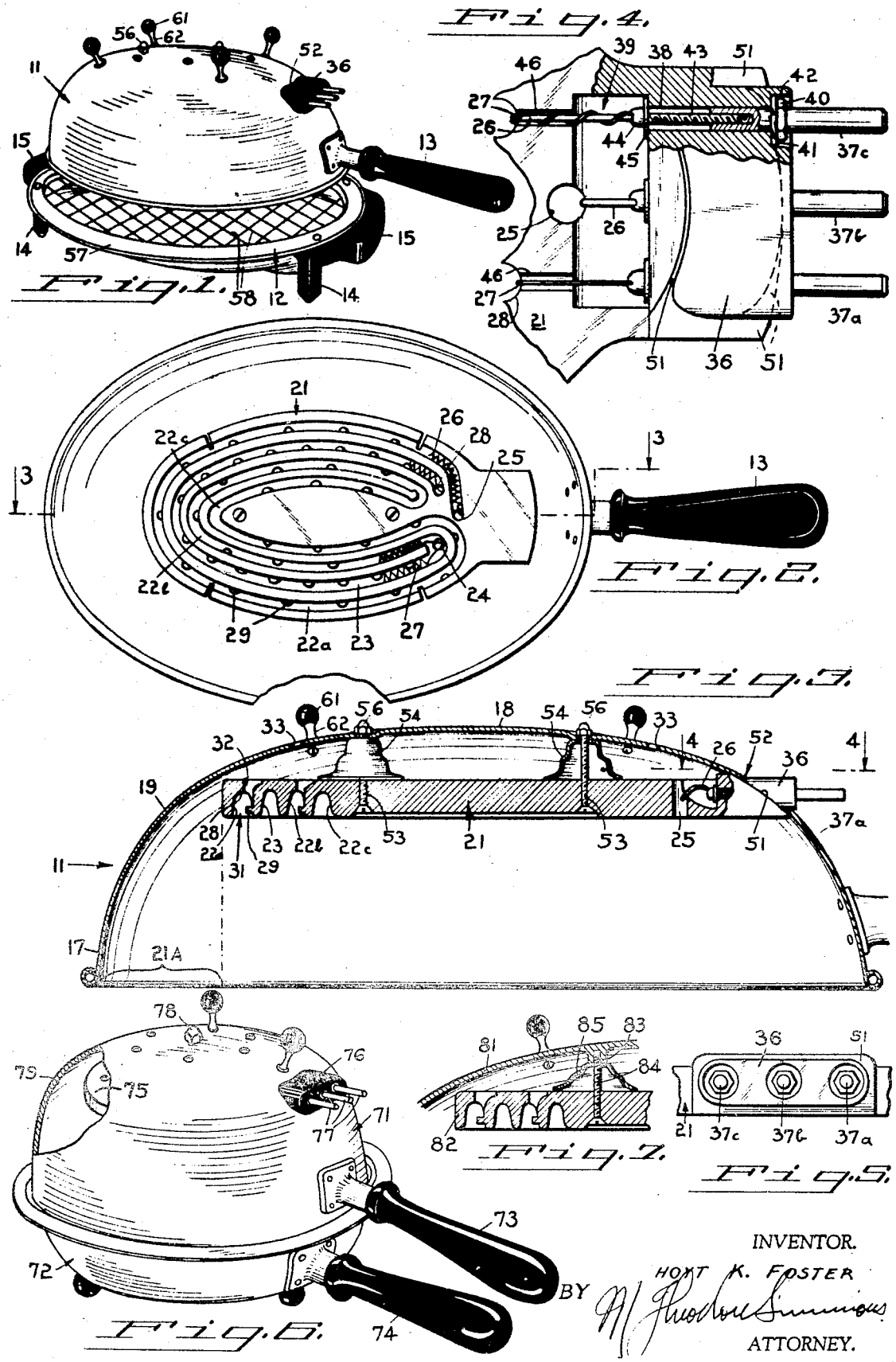
INVENTOR.
HOYT K. FOSTER
BY
ATTORNEY.

Patented June 24, 1941

2,247,229

UNITED STATES PATENT OFFICE 2,247,229

ELECTRICAL COOKING APPARATUS

Hoyt K. Foster, Hollis, N. Y., assignor to S. W. Farber, Inc., Brooklyn, N. Y., a corporation of New York Application June 3, 1939, Serial No. 277,124

3 Claims. (Cl. 219—19)

My invention relates to electrical cooking apparatus and more particularly to such an appliance intended for broiling various edibles, and for convenient use at the dining table.

It is known that most food stuffs are greatly improved in flavor and tastiness, as well as being more healthful to eat, if subjected to the action and intense heat of directly applied heat rays, and also if the cooked food is served immediately after the cooking is completed. Meats and fish are among such food stuffs, while eggs have an altogether different taste when so cooked.

Heretofore such devices as have been designed for table use have not given uniform results in operation and have been generally inefficient. Furthermore, such devices have been inconvenient to use and impractical for the housewife to clean.

One of the principal faults with prior devices is that the heat rays are not uniformly distributed or applied over the whole area of the grill which holds the food during cooking. Accordingly, the food which is in the center of the grill, nearest the heating element becomes cooked first, while that around the edges of the grill is uncooked or only partially cooked; or, in the alternative, the center part is over-cooked when that around the outside is sufficiently cooked.

It is one object of my invention to correct this fault by design and construction of the broiler housing and by the location of the heating unit therein so as to obtain uniform cooking over the whole area of the grill, and at a substantial distance beyond the perimeter of the heating unit. Accordingly, the broiler can be constructed in other shapes than the conventional round shape.

Other objects of my invention are to provide a heating unit for use in appliances of the above indicated character in which the mounting block for the projecting terminal pins is integral with the block that contains the resistance wire heating element, and in which there is an improved construction of terminal pin mounting in the block.

Further objects of my invention are to provide an improved construction of open-type heating unit, primarily for use in table-type broilers, which will give uniform heat radiation, will not permit the exposed resistance wire to sag or fall out of the element, will have longer life, is completely ventilated, and in which all wiring thereon is located within the body of the unit so as to leave no protruding wires that could be broken in ordinary handling and cleaning of the broiler.

Still further objects of my invention are to provide an improved method and means for mounting the heating unit in the table broiler so that the same may be readily removed therefrom and reassembled in place, and also correctly positioned therein.

Even further objects of my invention are to provide a heating unit to supply either a cooking temperature or a warming temperature in the broiler and in either case the heat will emanate from the whole surface of the heating unit, in which the warming temperature is obtained by placing a high resistance element in series circuit relation with the main heating element used for cooking, and in which these elements are connected to the terminal pins in a unique manner for the above purposes.

Other and further objects of my invention will be apparent from this specification taken in conjunction with the accompanying drawing, in which—

Figure 1 is a perspective view of an oval-shaped table broiler, the top and bottom being shown separated somewhat so as to reveal a portion of the food holding grill.

Fig. 2 is a bottom plan view of the top or upper part of the broiler, showing the heating unit mounted in place.

Fig. 3 is a vertical section of the top part, taken on the line 3—3 of Fig. 2, certain parts being shown in full lines and others being broken away to facilitate the illustration.

Fig. 4 is a top plan view in enlarged detail of the terminal pin mounting block, taken on the line 4—4 of Fig. 3, with parts broken away to facilitate illustration.

Fig. 5 is an end view detail of the terminal pin mounting block, when removed from the top of the broiler.

Fig. 6 is a perspective view of a round-type table broiler, parts being broken away to facilitate illustration, and Fig. 7 is an enlarged detail, in section, of a modified form of mounting for the heating element.

Referring to Figs. 1 to 5, the broiler comprises an upper or heater part 11, and a shallow bottom or tray part 12. The upper part has a projecting handle 13 made of insulating material. The bottom tray is supported at each end thereof by wooden or insulated legs 14. In the illustrated construction, the legs are integral with the carrying handle 15, the unitary piece being suitably secured to the rim of the tray.

In addition to being oval in cross section, the upper part 11 is dome-shaped as indicated in Fig. 3, the sides 17 being joined to the top 18 by a convex-concave portion 19 which is shaped on an arc of substantial radius so that the upper part has somewhat the shape of a parabolic section of a cone. This shape has been designed specially to greatly facilitate the matter of obtaining more even distribution of heat throughout the broiler and over the entire cooking surface. A heating unit 21 is positioned wholly within the dome shaped top 11 and is spaced and supported from the walls thereof, as will be hereinafter more fully described. The heating unit 21 is flat and substantially oval shaped. In area the unit extends horizontally near the dome-shaped wall, and vertically is so located that the perimeter of the heating element is substantially in the midst of the concaved portion 19. The somewhat concave surface of the portions 19 and 17 opposite and below the edges of the heating unit 21, together with the polished surface of the metal from which the dome-shaped part 11 is made, direct all of the heat waves reaching the same substantially straight downwardly around the space between the vertical projection of the perimeter of the heating unit 21 and the rim of the dome-shaped portion 11, this portion being indicated on Fig. 3 at 21A.

The heating unit 21 is a ceramic clay block which has in the face thereof a plurality of adjacent grooves 22a, 22b, 22c and 23. As will be seen from Fig. 2, grooves 22a, 22b and 22c are joined together so as to form a continuous path, and those grooves are arranged on either side of the groove 23. However, at one end the grooves 23 and 22b are joined together, and at the junction of these grooves a hole 24 extends through the clay body. Also, at the beginning of groove 22a, a second hole 25 extends through the clay body 21. The joined grooves 22a, 22b and 22c hold a continuous strip of resistance wire heating element, of the coiled type, indicated at 26, the ends of which extend respectively through the holes 24 and 25. This element 26 is intended to afford the maximum cooking temperatures, and will be termed the high heat element. The groove 23 contains a second coiled type resistance wire element 27, one end of which also extends through the opening 24, and the other end of which extends through a hole 28, at the opposite end of the groove 23. In the construction as it is used at the present, the element 27 is connected in series circuit with the high heat element when the broiler is used for warming purposes, or for maintaining the cooked foods hot until wanted, or for similar purposes requiring considerably lower temperatures than the cooking temperatures.

In order to receive the resistance elements 26 and 27, the bottoms of the respective grooves are rounded as indicated at 28, and extending partially across the grooves near the tops thereof are a series of ears 29 which are located at spaced intervals therealong. The ears are integral with the side walls of the grooves and extend only sufficiently across the grooves to require that the resistance elements be forced past the same—in other words, the opening 31 is of less width than the diameter of the coils of the resistance elements. There are a sufficient number of the ears 29 to insure that the resistance wire elements will not fall out of the grooves, or sag beyond the face of the heating unit block 21, when the same is in the position shown in Fig. 3.

In my preferred construction of heating unit 21, the ceramic block is extensively ventilated by a multiplicity of holes 32 through the block. In the construction shown, these holes occur behind each of the ears 29, which is a convenient manner of forming the ears in the manufacture of the ceramic block, but the holes need not be so located. Ventilation of the block is desirable in the construction of broiler shown for the reason that steam, vapors and the like must freely escape from the broiler, and for this purpose, the top portion 18 of the dome 11 also is sufficiently ventilated, some openings 33 being indicated for that purpose.

As indicated earlier in this specification, the mounting block 36 for the terminal pins 37a, 37b and 37c, is an integral part of the ceramic block 21 which carries the heating elements. Fig. 4 illustrates the detail of construction of the terminal block 36 and the connections between the heating elements and the terminal pins. Since the structure and mounting of the terminal pins is alike, it is only necessary to describe one in detail.

The block 36 has three holes 38 extending laterally therethrough from the inner pocket 39 to the outer end of the block 36, one for each of the terminal pins. Each terminal pin has a nut 40 thereon which engages a washer 41 at the base of a pocket 42 when the pin is mounted in place. Each pin is internally screw threaded at its lower end to receive the screw 43 which extends through the hole 38 from the inner pocket 39. The screw 43 is provided with a head 44 and engages a washer 45 which bears against the wall of the inner pocket to hold the terminal pin firmly in place. The ends of the heating elements which extend through the holes 24 and 28 respectively lie in grooves 46 that extend from the holes 24 and 28 to the inner pocket 39, while the hole 25 enters the pocket 39. The ends of the heating elements are fastened to the heads of the screws 43 respectively inside the pocket 39, so that there is no electric wiring outside the outer surfaces of the combined heating element and terminal pin mounting block.

One end of the heating element 26 and one end of the resistance element 27 are connected together to the outer terminal pin 37c; the other end of the element 27 is connected to the outer terminal pin 37a; and the other end of the element 27 is connected to the center terminal pin 37b. A properly constructed and wired disconnectible service plug, not shown, but adapted to be connected to a source of electric current, fits upon the terminal pins so that in one position of the plug current is supplied to the heating element 26, and in another position of the plug the high resistance element 27 is connected in series circuit with the heating element 26 so that current is supplied to both elements. The selection is entirely at the will of the user for the particular service to which the broiler is being put.

By the described arrangement of connections for the elements 26 and 27 several important advantages are obtained in addition to the reduction in cost of manufacture by decrease in the size of the element 27 over what would be the required size if that element were used alone to provide the equivalent warming temperature. With the two elements in series, both elements are energized so that heat is distributed over the whole heating unit notwithstanding that the temperature produced is considerably below cooking temperatures.

Furthermore, by this arrangement of the elements, all current supplied is effectively used inside the broiler. Also, the arrangement of the elements and their connections to the terminal pins is such that there is no cross-over of wires at any place in the heating unit so that danger of a short circuit is substantially eliminated. Of course, the elements 26 and 27 may be regarded as separate heating elements, but as is apparent from the above discussion, for cooking the large heating element 26 is used independently, and when merely warming temperatures are desired, the two elements are connected in series circuit, and the element 27 is not used alone.

Referring now to the improved means for mounting the heating unit in place, the terminal pin block 36 has a surrounding outwardly extending shoulder 51 (Figs. 3, 4 and 5). The dome-shaped shell is provided with an opening 52 through which the terminal pin block 36 projects, and which is only large enough to snugly receive the reduced portion of the block 36. When the block is mounted in place, as shown in Fig. 3, the inner surface of the shell rests firmly against the surrounding shoulder 51, and the end of the block with the terminal pins projects through the shell 11. The heating unit is thus firmly supported and anchored at one end, as well as being properly and accurately positioned in place in the dome-shaped portion, and at the same time the terminal pins are insulated from the shell by the block and are conveniently mounted for access outside the broiler. The block 21 is additionally fastened to the dome-shaped top by a pair of bolts 53 which pass through hollow spacers 54 and receive nuts 56 which are located upon the outside of the dome-shaped top, as shown in Fig. 3. Whenever it is desired to remove the heating unit for repair or for cleaning the inside of the broiler, the nuts are removed and the block 36 is slid out of the opening 52. The reverse operation re-assembles the heating unit in position.

When used as a broiler or toaster, the top part 11 rests upon the bottom tray 12 of the broiler, fitting inside the flange 57. Also fitting in the bottom tray is a grill 58, upon which is placed the food stuffs to be cooked, the grill also being of a size to fit easily within the dome-shaped top 11, when positioned upon the tray 12.

With the construction and arrangement of parts hereinbefore described, the foodstuffs placed upon the grill will be cooked thoroughly, quickly and evenly, and that at the outer edges of the grill will be cooked as rapidly and as uniformly as that near the center of the grill. The heat will not reach the table to damage the same because of the insulated legs 14, which are also high enough to permit free circulation of air under the tray 12.

The top part 11 may be inverted from the broiling position shown in Fig. 3, and the heating unit used as a hot plate or stove to heat vessels resting thereon. When inverted the top 11 rests upon the heat insulated ends 61 of the supporting feet 62 which are secured to the top 11 in any suitable manner, such as by screws.

Fig. 6 illustrates the foregoing principles applied to a round instead of an oval shaped appliance. The top part 71 rests upon a bottom part 72 having handles 73 and 74 respectively. The heating elements are mounted in a ceramic block 75 and the integral terminal pin block 76 projects through an opening in the top part 11 so that the terminal pins 77 are accessible for the application of a disconnectible service block. In this instance the ceramic block 75 is held in place by a single bolt, the nut 78 of which is indicated at the center of the top 71.

As will be seen from the broken-away portion, the top 71 is dome-shaped and the heating unit is positioned near, but spaced from the upper portion of the top 71 opposite the arced portion 79 which joins the flattened top portion and the side wall of the top 71, so that the same radiating and reflecting effects are obtained in the round shaped broiler as have been described with respect to the oval shaped broiler in order to secure uniform cooking over the entire surface of the grill, not shown, but which is located between the top and bottom parts 71 and 72.

Fig. 7 shows a fragmentary view of a modified manner of securing the heating unit block to the top part. In this figure, the top is indicated at 81, and the heating unit block at 82. The top has secured to the inner surface thereof a screw threaded boss 83 which receives the end of the screw 84. The heating element block 82 is held spaced from the top 81 by the spacer 85. In this case, to remove the heating element, the user unscrews the screw 84 and removes the heating unit block as described above.

Modifications may be made in the arrangement and location of parts within the spirit and scope of my invention, and such modifications are intended to be covered by the appended claims.

I claim:

1. In a table type broiler, an electrical heating unit comprising a flat ceramic block having a plurality of grooves in the front face thereof, a reduced extension integral with said block and forming a terminal pin mounting, a pocket in the rear face of the block and located between the extension and the grooved portion, small apertures extending rearwardly from said grooves and communicating with said pocket at the rear of said block, terminal pins mounted in said extension, means extending into said pocket for mounting the pins in said extension, a heating element of the resistance wire type mounted in said grooves, and connections from the heating element to said pins, said connections extending through said apertures and into said pocket.

2. In a table type broiler, an electrical heating unit comprising a flat ceramic block having a plurality of grooves in the front face thereof, a reduced extension integral with said block at one side thereof and forming a terminal pin mounting, a pocket in the rear face of the block and located between the extension and the grooved portion, small apertures extending rearwardly from said grooves and communicating with said pocket at the rear of said block but within the body of the block, terminal pins mounted in said extension, means extending into said pocket for mounting the pins in said extension, a heating element of the resistance wire type mounted in said grooves, and connections from the heating element to said pins, said connections extending through said apertures and into said pocket and within the confines of said block.

3. In a table type broiler, a cover therefor having walls which are curved in all directions from the edges of the cover to the top thereof, an opening in the wall of said cover, an electrical heating unit comprising a flat ceramic block having a plurality of grooves in the front face thereof, a reduced extension integral with said block for the mounting of terminal pins, said block fitting in said opening so as to position and in part mount said heating unit, terminal pins carried by said extension, and extending outside said cover, a heating element of the resistance wire type mounted in said grooves and connected to said terminal pins, the ceramic block being positioned close to but spaced slightly from the top and curved sides of said container thereby locating the outermost groove close to the rounded sides so that the curved sides cooperate in the even distribution of the radiations from said heating element in the area outside said block, and means for securing the block in place in said cover.

HOYT K. FOSTER.